United States Patent Office 2,971,007
Patented Feb. 7, 1961

2,971,007

N-(9-XANTHYL) TETRACYCLINES

Lee C. Cheney, Fayetteville, and William J. Gottstein, Syracuse, N.Y., assignors, by mesne assignments, to Bristol-Myers Company, New York, N.Y., a corporation of Delaware No Drawing. Filed Feb. 20, 1959, Ser. No. 794,512

6 Claims. (Cl. 260—335)

This invention relates to new antibiotic compounds and, more particularly, to 9-xanthenol derivatives of the tetracycline antibiotics.

The tetracycline antibiotics include tetracycline, chlortetracycline, oxytetracycline, bromotetracycline and anhydrotetracycline. Tetracycline is probably the most useful of the tetracycline antibiotics; tetracycline, oxytetracycline and chlortetracycline are a preferred subgroup of the tetracycline antibiotics because of their ready availability and demonstrated clinical utility. The chemical and physical properties of anhydrotetracycline and certain methods of its preparation are described in United States Patent No. 2,744,932. Unlike the above-mentioned preferred subgroup of the tetracycline family, anhydrotetracycline has been of relatively little interest since its discovery because of its relatively minor antibacterial activity and tendency to be serum-bound following administration. The antibacterial activity of anhydrotetracycline has been said to be on the order of one-fifth to one-tenth the microbiological activity of tetracycline. It has become well known in the antibiotic arts that many micro-organisms have become resistant to these currently available antibiotics and, consequently, the effectiveness of these known and available antibiotics in cases of infection by resistant organisms has been quite limited.

It is therefore an object of the present invention to provide derivatives of currently available tetracycline antibiotics having low toxicity, enhanced stability and improved antibacterial effectiveness against resistant strains of microorganisms. It is a particular object of the invention to provide derivatives of the tetracycline antibiotics which are therapeutically effective against resistant strains of *Staphylococcus aureus*. It is also an object of the present invention to provide derivatives of tetracycline antibiotics which have low solubility in water and which have a decreased tendency towards serum-binding.

The objects of the present invention have been achieved and there is now provided by the present invention a group of new antibiotic compounds comprising.

wherein $R_1$ is a member selected from the group consisting of hydrogen and hydroxyl, $R_2$ is a member selected from the group consisting of hydrogen, chloro and bromo and at least one of $R_1$ and $R_2$ is hydrogen. In particular, there is provided by the present invention a group of new antibiotic compounds selected from the group consisting of N-(9-xanthyl)tetracycline, N-(9-xanthyl)chlortetracycline, N-(9-xanthyl)bromotetracycline, N-(9-xanthyl)-oxytetracycline and N-(9-xanthyl)anhydrotetracycline. These compounds are herein called 9-xanthenol derivatives of the various tetracycline antibiotics and are prepared by substantially equivalent procedures involving the reaction of 9-xanthenol and the various tetracycline antibiotics in glacial acetic acid or other appropriate reaction media. Preferred methods for the preparation of the compounds of this invention are set forth in Examples I-IV below.

The invention is illustrated without limitation thereof by the following specific examples.

EXAMPLE I

*The preparation of N-(9-xanthyl)tetracycline*

To 500 ml. of glacial acetic acid contained in a 1-liter Erlenmeyer flask was added slowly with stirring 60 g. (0.135 mole) of anhydrous tetracycline. After nearly all of the tetracycline had dissolved, 29.8 g. (0.150 mole) of 9-xanthenol (xanthydrol) was added and the mixture was heated and stirred on the steam-bath at 45–50° C. for 15–20 minutes. The resulting solution was poured into 2 liters of water to form a milky precipitate which was extracted with 2 liters of ethyl acetate in 3 portions. The combined extracts were washed with 500 ml. of water. The organic layer was concentrated under reduced pressure on the steam-bath to a volume of approximately 400 ml. Dilution with 500 ml. of methanol and chilling caused 50.2 g. of product to crystallize. Recrystallization was accomplished by dissolving the material in 300 ml. of warm ethyl acetate and diluting the solution with 300 ml. of methanol. After drying for two days in vacuo over phosphorus pentoxide, the yellow crystals weighed 36.9 g. (40% yield); M.P. 178–180° C. (dec.) (with previous darkening and shrinking commencing at about 154° C. when the temperature was raised 3° C. per minute).

For analysis a sample was dried in vacuo at 110° C. over phosphorus pentoxide for two hours.

*Analysis.*—Calcd. for $C_{35}H_{32}N_2O_9$: C, 67.30; H, 5.17; N, 4.49. Found: C, 67.4; H, 4.86; N, 4.45; volatile, 6.50.

Because the solubility of N-(xanthyl)tetracycline in water is less than 0.1 mg./ml., a suspension for bioassay was prepared by weighing 100 mg. of a micronized sample into 50 ml. of distilled water, adding 6 drops of Tween 40 (polyoxyethylene derivatives of mixed partial esters of common fatty acids and hexitol anhydrides) and 6 drops of acetone and finally diluting to a volume of 100 ml. with water. The in vitro biological activity is about 315 µg./mg. Upon administration by the intramuscular route to mice infected with *D. pneumoniae*, the mortality rate of such infected mice is decreased and the survival time of such mice is increased. In in vitro tests with a resistant *Staphylococcus aureus* organism, the minimum inhibitory concentrations of tetracycline hydrochloride was greater than 50 µg./ml., but with N-(9-xanthyl)tetracycline was only 1.56 µg./ml.

The 6µ infrared band for N-(9-xanthyl)tetracycline is split into 3 peaks at 6.1, 6.2 and 6.3µ and shows a doublet at 6.53 and 6.58µ. There is no alteration of the 3µ region. The ultraviolet absorption spectrum of N-(9-xanthyl)-tetracycline displays maxima at 371 mµ ($E_{1\,cm.}^{1\%}$ = 134)

and at 274 mμ (E$_{1\,cm.}^{1\%}$ = 153)

EXAMPLE II

*Preparation of N-(9-xanthyl)tetracycline*

Five g. (0.025 mole) of 9-xanthenol (xanthydrol) was dissolved in 50 ml. of acetic acid. The resulting turbid solution was filtered and 5 g. (0.0112 mole) of tetracyline was added to the filtrate. The resulting solution was heated to 75° C. under nitrogen for 20 minutes in a water bath, diluted with 3 volumes of water and then extracted with 50 ml. of ethyl acetate. The ethyl acetate was evaporated from the resulting extract and the residue diluted with ether and filtered. After drying in vacuo over phosphorus pentoxide, the resulting crude N-(9-xanthyl)-tetracycline weighed 3.5 g. and melted at 165–170° C. with decomposition.

EXAMPLE III

N-(9-xanthyl)oxytetracycline, N-(9-xanthyl)-bromotetracycline and N-(9-xanthyl)chlortetracycline are prepared according to the procedure of Example I by the use of 0.135 mole of oxytetracycline, bromo tetracycline and chlortetracycline, respectively, in place of the 0.135 mole of tetracycline of Example I.

EXAMPLE IV

*Preparation of N-(xanthyl)anhydrotetracycline*

To a solution of 60 g. (0.135 mole) of anhydrous tetracycline dissolved in 500 ml. of glacial acetic acid was added 29.8 g. (0.15 mole) of 9-xanthenol. The resulting solution was filtered and heated at 45–50° C. for about 30 minutes. The solution was then diluted with about one liter of water and extracted with ethyl acetate. The ethyl acetate extract was then concentrated under reduced pressure to about one-third of its original volume on a steam-bath. The concentrated ethyl acetate solution was then diluted to one liter with methanol, cooled in an ice-bath and the resulting precipitate, weighing 49 g., was removed by filtration. A 10 g. portion of the precipitate was stirred with 40 ml. of 6 N hydrochloric acid for about 20 minutes, diluted with 50 ml. of isopropanol and stirred for about 18 hours. The solid materials were removed from the solution by filtration and suspended in 100 ml. of water to which 15 ml. of pyridine was added. The resulting mixture had a pH of about 4. An additional 10 ml. of pyridine was added and the mixture was extracted with ethyl acetate. The ethyl acetate extract was washed with water and concentrated to about one-third of its original volume by evaporation. Upon the addition of 75 ml. of methanol and warming on the steambath, a bright yellow precipitate was formed. The precipitate was removed from the solution by filtration and dried in a desiccator over phosphorous pentoxide. This material, N-(xanthyl)anhydrotetracycline, weighing 5.2 g., softened gradually at 170–189° C. with decomposition. The material was reprecipitated from methanol with a yield of 2 g.

*Analysis.*—Calculated for $C_{35}H_{30}N_2O_8$: C, 69.30; H, 4.98. Found: C, 69.1; H, 5.22; volatile 7.65.

Because the solubility of N-(xanthyl)anhydrotetracycline in water is very low (about 79 γ/ml.), a suspension for bioassay was prepared by weighing 4 mg. of a micronized sample into 25 ml. of a solution comprising 10 ml. dimethyl formamide and 15 ml. water and 1 drop of Tween 40 (polyoxyethylene derivatives of mixed partial esters of common fatty acids and hexitol anhydrides). The in vitro biological activity is about 850 μg./ml. Upon in vivo assay in mice it is found that N-(xanthyl)-anhydrotetracycline possesses antibacterial activity against certain strains of resistant *Staphylococcus aureus* and has less tendency to be serum-bound than anhydrotetracycline.

We claim:

1. A compound selected from the group consisting of compounds having the formula:

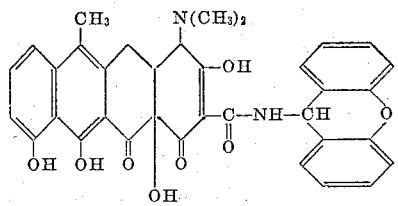

and

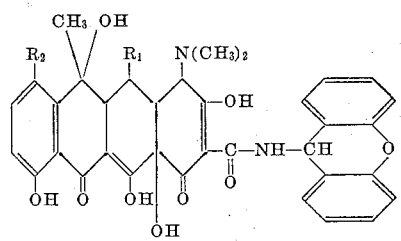

wherein $R_1$ is a member selected from the group consisting of hydrogen and hydroxyl, $R_2$ is a member selected from the group consisting of hydrogen, chloro and bromo and at least one of $R_1$ and $R_2$ is hydrogen.

2.

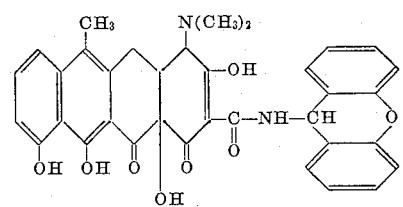

3.

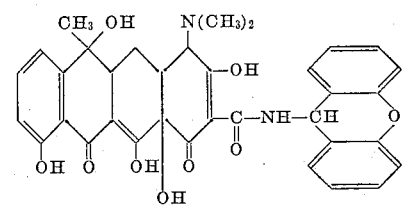

4.

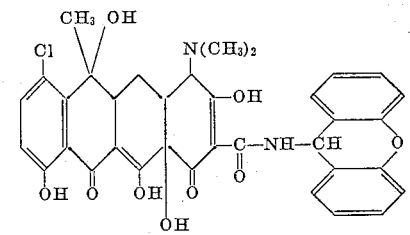

5.

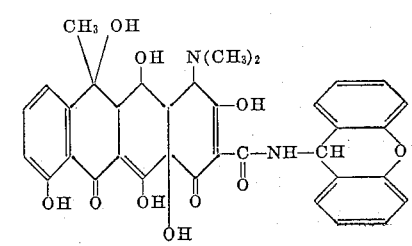

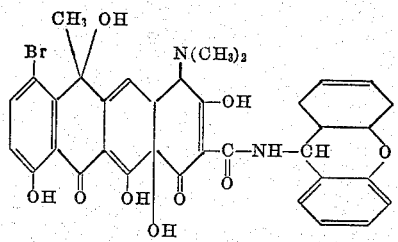
References Cited in the file of this patent
UNITED STATES PATENTS
| | | |
|---|---|---|
| 2,482,055 | Duggar | Sept. 13, 1949 |
| 2,516,080 | Sobin | July 18, 1950 |
| 2,520,153 | Lawson | Aug. 29, 1950 |
| 2,699,054 | Conover | Jan. 11, 1955 |
| 2,744,932 | Waller | May 8, 1956 |
FOREIGN PATENTS
| | | |
|---|---|---|
| 3169/57 | South Africa | July 2, 1958 |